May 27, 1952 — T. E. BART — 2,598,488
WATER SERVICE FIXTURE
Filed Sept. 3, 1946 — 4 Sheets-Sheet 1
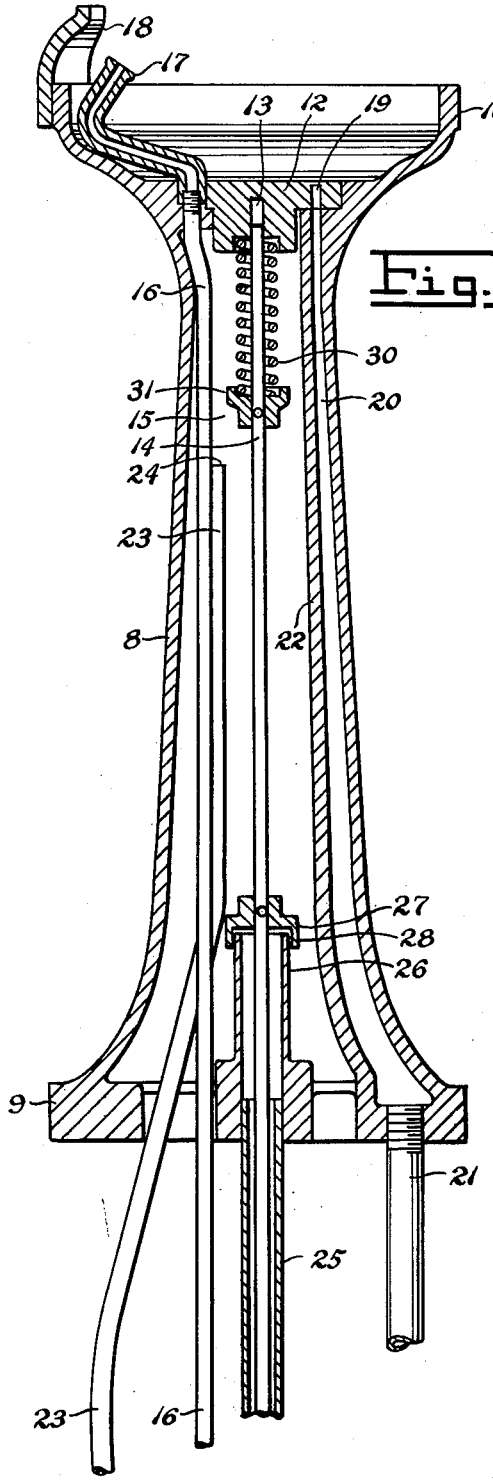
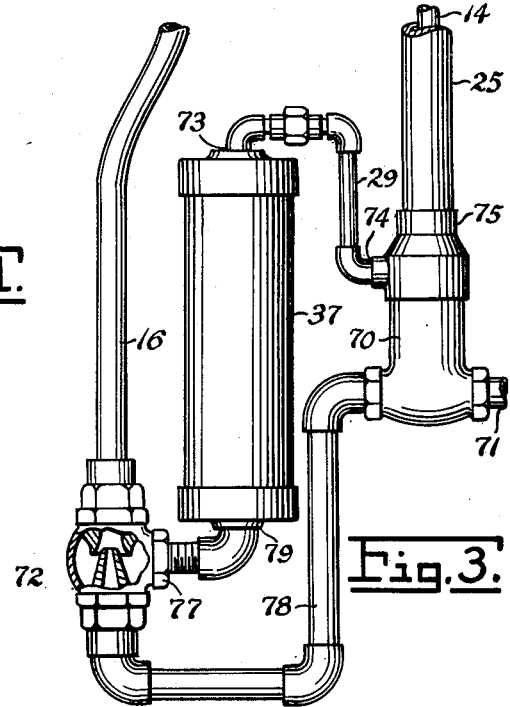
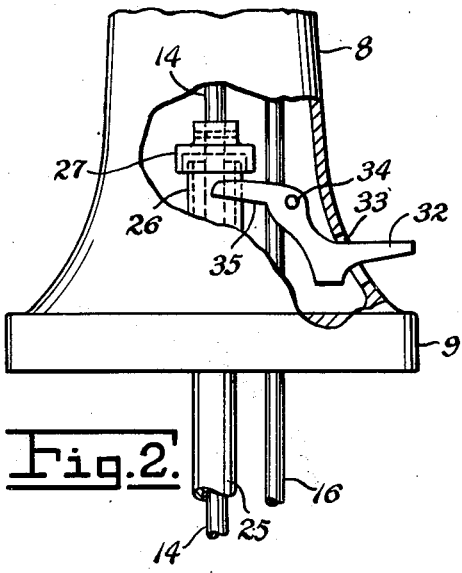
INVENTOR.
Thomas E. Bart
BY Zugelter & Zugelter
Att'ys.

May 27, 1952 — T. E. BART — 2,598,488
WATER SERVICE FIXTURE
Filed Sept. 3, 1946 — 4 Sheets-Sheet 2

INVENTOR.
Thomas E. Bart
BY Zugelter & Zugelter
Attys.

May 27, 1952          T. E. BART          2,598,488
WATER SERVICE FIXTURE

Filed Sept. 3, 1946          4 Sheets-Sheet 3

INVENTOR.
Thomas E. Bart
BY Zugelter & Zugelter
Attys.

May 27, 1952 — T. E. BART — 2,598,488
WATER SERVICE FIXTURE
Filed Sept. 3, 1946 — 4 Sheets-Sheet 4

INVENTOR.
Thomas E. Bart
BY Zugelter & Zugelter
Attys.

Patented May 27, 1952

2,598,488

UNITED STATES PATENT OFFICE 2,598,488

WATER SERVICE FIXTURE

Thomas E. Bart, Cincinnati, Ohio, assignor to The Murdock Mfg. & Supply Co., Cincinnati, Ohio, a corporation of Ohio Application September 3, 1946, Serial No. 694,601

2 Claims. (Cl. 137—13)

The present invention relates to a water service fixture involving an improved construction whereby the fixture is rendered safe to a maximum degree against pollution and freezing. The fixture is designed especially to overcome all objection and meet all the requirements of public health bureaus and officials charged with the duty of condemning service fixtures which might permit pollution of potable water distribution systems.

One object of the invention is to provide an anti-freezing fixture construction which cannot induce pollution of the potable water supply through cross-connections with sewers, drainage pits, or contaminated subterranean or ground waters.

Another object is to reduce to a minimum the possibility of back-siphonage in such fixtures, and the entry of surface water therein.

Another object is to eliminate in devices of the character stated, the customary service box which usually is embedded in the earth or in a platform of one kind or another, such boxes being objectionable as a source of contamination and as an undesirable obstruction in platforms and paved surfaces used for pedestrian and freight traffic.

A further object is to simplify and reduce the labor and expense of installation and maintenance of a sanitary anti-freezing type of water service fixture, with elimination of the usual trenching or sumps, and the pumps customarily associated therewith.

Another object is to eliminate moving parts in a device of the character described.

Another object is to provide a device of the character referred to which is simple, relatively inexpensive, and thoroughly reliable in its functions of eliminating freezing and pollution of the potable water supply.

Another object of the invention is to provide a fixture of the character stated which is so constructed as to withstand severe usage and abuse for extended periods of time, and which employs no delicate parts subject to breakage, injury or deterioration in service.

The foregoing and other objects are attained by the means described herein and illustrated upon the accompanying drawings, in which:

Fig. 1 is a vertical cross-sectional view of a drinking fountain embodying part of the invention.

Fig. 2 is a fragmental plan view of the base of the fountain pedestal, part being broken away.

Fig. 3 is an elevational view, part broken away, showing that portion of a water service fixture which is usually located in the earth below the frost line.

Figures 4, 5:
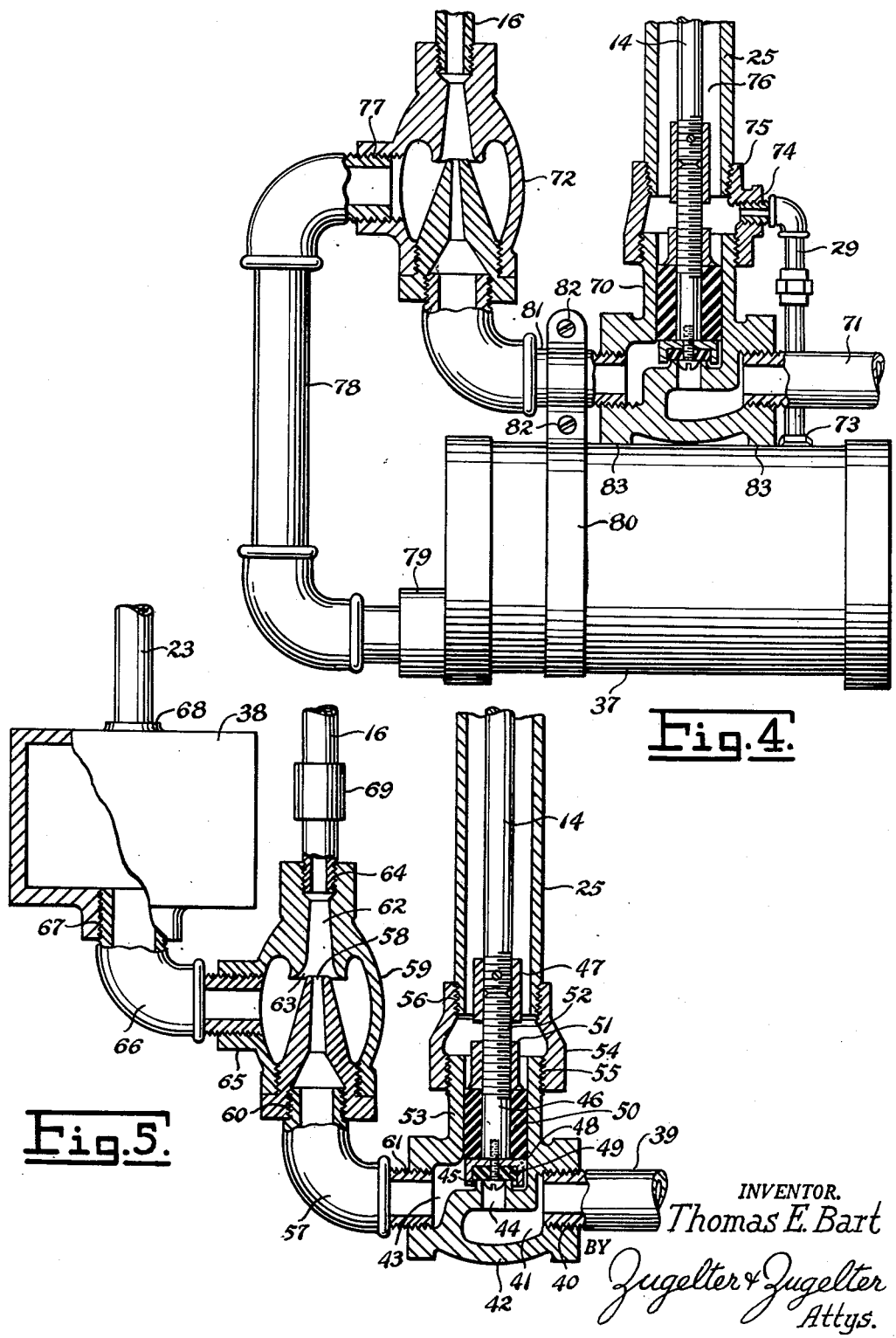
Fig. 4 is a side elevational view, partly in cross-section, showing a modification of the structure illustrated by Fig. 3.
Fig. 5 is a view similar to Fig. 4, showing a second modification.

Extensive investigation and many years of experience in the production of anti-freezing non-pollutable hydrants and water service fixtures, has revealed that no fixture of the type referred to has yet been offered or proposed, which would meet the objections and requirements of public health agencies charged with the duty of eliminating pollution of public water distribution systems. The problem of avoiding pollution through anti-freezing water service fixtures has never been solved heretofore. It is a well known fact that pollution of potable water systems has on various occasions brought disease and death to persons drinking supposedly clean water, from fixtures located at great distances from the source of pollution, with the result that great difficulty was experienced in locating and condemning the particular fixture at which the contamination entered the public distribution system. In most instances of the kind referred to, the pollution eventually was traced to an anti-freezing hydrant or water service fixture which was not necessarily faulty, but simply incapable of preventing entry of contaminating substances under various natural conditions. In some instances the pollution of the water distribution system resulted from flash floods, in which vital parts of the fixture were submerged. In other instances leaky valves were to blame, while in still others there were found sewage cross-connections either direct or indirect in character, due to overloaded sumps or drainage beds, or to an excess of ground water in the vicinity of the fixture.

Pollution of water distribution systems has often resulted from breaks in the water mains, and the attendant creation of a vacuum in one or more sections of the system. In such cases, an open fixture or a leaky valve therein provided a most frequent source of pollution. As above stated, conditions such as have been referred to in the foregoing explanation, have so contaminated the potable water supply as to bring disease and death to persons drinking from other fixtures located not only in the immediate vicinity of the pollution source, but also at remote locations where pollution was entirely unexpected.

One of the principal objectives of the present invention is that of obviating to the maximum extent, the causes of pollution of potable water distribution systems under all circumstances, including even those extenuating circumstances which pervail in most railroad yards, where the topography is particularly unfavorable to pollution elimination. The invention contemplates eliminating all possibility of cross-connection, and also the commonly ineffective use of ditches, trenches, sumps and pumps that cannot be depended upon under all weather and climatic conditions. With the improved device herein disclosed, there is no drainage provided to the ground or to a sewer, and for that reason no direct or indirect cross-connection to sewage or contaminated drainage is possible. The fixture eliminates the need for a box housing, thereby removing the many objections to the box type of fixture in which rubbish and dirt invariably accumulated, with the resultant threat of contamination. Elimination of the box obviates also the need for trenching to carry away surface water, and provides various other advantages which have been noted previously herein.

Referring to the accompanying drawing, 8 indicates a typical drinking fountain pedestal of cast metal or other suitable material, including a base 9 and a bowl 10. The bowl supports a bottom plate 12 bored centrally thereof as at 13 to furnish a guide for the vertically shiftable valve rod 14 that extends upwardly through the chamber 15 of the pedestal. An upright pipe or riser 16 within the chamber supplies potable water to a discharge nozzle 17 located within the bowl, said nozzle being protected by the usual mouth guard 18. By means of an opening 19 in plate 12, the bowl is placed in communication with a duct 20 formed in the fountain pedestal, said duct at the base of the pedestal having connection with a sewer, drainage pit or other waste receiving means through the agency of a waste water drain pipe 21. Duct 20 is separated from the chamber 15 of the pedestal by means of an interior wall 22 which may be cast integrally with the pedestal body.

For the purposes of this description, it may be assumed that the drinking fountain structure of Fig. 1 is associated with the mechanism illustrated by Fig. 5, the latter preferably being buried in the earth below the frost line. The base of the pedestal, of course, rests upon the surface of the ground, or upon a suitable platform of concrete or the like provided especially as a support for the pedestal. In Figs. 1 and 5, the valve rod is indicated at 14, whereas 16 indicates the riser that furnishes potable water to the drinking nozzle. The character 23 represents an air vent tube which may extend to any desired elevation above ground level. In the illustration of Fig. 1, this vent tube is shown extending well into the chamber 15 of the pedestal, to an elevation considerably higher than the pedestal base. As is obvious, the open upper end 24 of the air vent tube might terminate either within the pedestal, or outside the limits thereof as may be desired. In some instances, as illustrated by Fig. 4, for example, the air vent tube may communicate with the interior of the casing 25 that houses the valve rod, in which case the vent will terminate at the upper end of the housing 26 (Fig. 1), which extends above ground level. A protective cap 27 fixed to valve rod 14, and having a skirt 28 slidably related to housing 26, affords a means of protecting the casing pipe 25 and the air vent tube 29 of Fig. 4 against entry of dirt, dust and other foreign substances. Sufficient clearance is provided between skirt 28 and housing 26 to allow for ingress and egress of air moving through the vent 29 while the fixture is operating.

Reverting back to Figs. 1 and 4, wherein the air vent tube terminates at 24 within the pedestal 8, it will be seen that valve rod 14 normally is uregd in a downward direction by means of a spring, surrounding the rod and compressed between the plate 12 and a spring seat member or collar 31 fixed upon the rod. The rod is adapted to be lifted in any suitable manner for opening a valve directing water into the riser 16, and in the example as illustrated by Fig. 2, lifting of the rod may be performed by means of a foot pedal 32 extending through an opening 33 in the side of the pedestal base. The pedal may be pivoted at 34, and will preferably include a fork 35 to contact the skirt of the protective cover element 27. As previously stated, the vent tube of Fig. 2 may terminate within housing 26, if desired. In either case, the air vent for a clean water storage tank or reservoir 37 or 38 exhausts at some distance above ground level.

In Fig. 5, the character 39 indicates a potable water supply main which forms part of the public water distribution system, and the end 40 thereof has a tight connection with the inlet chamber 41 of a control valve whose body in indicated at 42. The valve body has also an outlet chamber 43 to be placed in communication with the inlet chamber through a port 44 within the partition wall of the valve body, said port being surrounded by a seat 45.

The valve disclosed by Fig. 5 is of the sliding or reciprocating type, wherein an extension 46 of the valve rod 14, coupled together at 47, carries at its lower end a cup 48 containing a valve seat member or washer 49 of fiber, plastic, rubber or any other suitable wear resistant material. The cup and washer may be held to the valve rod extension by means of a screw or other fastening device as shown. In addition to the valve member 49, extension 46 carries a sleeve 50 of fiber, rubber, plastic or composition material suitable for valve usage, said sleeve being held firmly against the cup 48 in any suitable manner, as by means of a nut or threaded retainer 51 applied to the threads 52 of the valve rod extension. The sleeve member 50 has a snug fit within the upstanding hollow neck 53 of the valve body, so that water may not escape from the outlet chamber 54 past the valve sleeve 50 and along the neck 53 of the valve body. The interior of neck 53 preferably is highly finished or polished to permit vertical sliding movement of the valve parts 49 and 50 in opening and closing the valve by means of the foot pedal 32, or its equivalent.

To prevent entry of foreign substances into the space about the valve rod, a tight and rigid connection may be provided with the use of a coupler 54 threaded at 55 and 56 onto the end of the valve neck and the end of the valve rod casing or tube 25, respectively. The coupling indicated at 47 provides for easy separation of the valve rod section 14 from the short section 46, whenever it is necessary to replace any of the working parts of the valve.

From the foregoing, it will be apparent that elevating movements of the valve rod serve to open the valve and permit flow of potable water therethrough from the supply line 39, whereas lowering of the valve rod by means of the spring 30 effectively closes the valve and separates the outlet chamber 43 from the inlet chamber 41 and the supply line thereto connected.

By means of a fitting 57 which may be in the form of an elbow, the outlet chamber 43 of the valve is placed in communication with the nozzle or jet 58 of an ejector whose body is indicated at 59. The connections at 60 and 61 are fluid-tight, and may be threaded connections as shown. Water entering the elbow from the valve is directed vertically upwardly through the nozzle 58, and enters a tapered bore 62 which is flared at 63 to effect an ejector action within the body 59. By means of a threaded connection or the like at 64, a tight connection is effected between the ejector body and the riser 16 which supplies the nozzle within the bowl of the fountain.

Means are provided for draining the riser of any unused water standing therein, so that freezing of water may not occur within the riser at low temperature. For this purpose, the body of the ejector may be furnished with a lateral relief port 65 which may be connected by means of a fitting such as elbow 66 to the interior of the clean water storage tank or reservoir 38. The elbow may be threadedly or otherwise securely connected to the tank bottom as at 67, so that no extraneous water or substances may enter the tank or reservoir at that connection, or at any of the other connections heretofore mentioned. A secure connection is afforded also at 68 where the air vent pipe or tube 23 enters the tank 38, preferably through its top wall.

From the foregoing, it will be appreciated that elevating the valve rod 14 will unseat the valve, permitting a stream of water to flow through the ejector 58 and upwardly into the riser 16 for supplying the drinking nozzle 17 at the bowl of the fountain. When the valve rod is released, as by lifting the foot from pedal 32, the valve 49 will close and thereby terminate the supply of water to the riser. Instantly thereafter, the head of water within the riser will flow downwardly into the ejector body, through the port 65 thereof, and into the storage tank or reservoir 38 which is made sufficiently large to accommodate the drainage from the riser. The water in entering the storage tank or reservoir 38 displaces air upwardly through the vent tube 23. With the riser thereby relieved of its column of unused clean water, freezing of the mechanism is effectively prevented since the storage tank or reservoir 38 is located below the frost line along with the ejector and the main valve 42.

Upon a subsequent opening of the main valve to supply water to the discharge nozzle 17, the ejector action occurring at 58—63 immediately empties the storage tank or reservoir 38 and directs the unused clean water from the tank upwardly through the riser along with the water that emanates from jet 58. As will be appreciated, the water thereby evacuated from tank or reservoir 38 is clean and potable, so that no opportunity is afforded for contamination or pollution of the riser and the discharge nozzle 17 at the bowl of the fountain. The character 69 indicates simply a coupling whereby the riser 16 may be easily disconnected in the region of the ejector housing.

In the modified form of the device illustrated by Fig. 4, the valve indicated at 70 is exactly the same as the main valve described in connection with Fig. 5, the purpose thereof being to control the flow of potable water from a supply line 71 to the ejector indicated at 72. The ejector is identical with that of Fig. 5 and is connected to the outlet port of the main valve in a manner similar to that previously described. The valve rod in Fig. 4 is indicated at 14, and 16 indicates the riser. The only difference between the constructions illustrated by Figs. 4 and 5, is that in Fig. 4 the clean water storage tank or reservoir, indicated at 37, is mounted beneath the main valve and is vented into the valve rod housing 25 through the vent pipe or tube 29. The vent pipe or tube in this instance communicates with the top of the tank at the location 73, and is coupled to a lateral port 74 of the fitting 75, so that air moving through the vent pipe will travel within the space 76 provided between the valve operating rod 14 and its casing tube 25. The space 76 in turn may vent at the upper end of housing 26 (Fig. 2), where the skirt of the protective cap 27 loosely surrounds said housing. By reason of the fact that the venting region at 26 is well above the base of the pedestal, it is impossible for ground water, dirt and other contaminating agents to enter the clean water tank or reservoir through the vent tube 29. The skirted cap 27 likewise performs as a means of excluding dirt and contaminating materials from the clean water storage tank.

Referring back to Fig. 4, it will be noted that the lateral port 77 of the ejector is connected by means of a pipe 78 with the hollow boss 79 that extends from one end of the tank. A suitable bracket or band 80, fixed to the nipple 81 by means of screws or bolts 82, affords a rigid and durable construction capable of withstanding any strains that might be imposed upon the assembly incident to burial thereof in the earth. The body of valve 70, if desired, may be welded or otherwise fixed to the top of the tank at the locations 83—83; however, this will not ordinarily be found necessary since adequate support may be furnished for the tank through the rigid connection afforded by the vent pipe or tube 29 which joins the tank with the coupling or fitting 75. It is possible, of course, to extend the vent tube 29 of Fig. 4 upwardly through the base of the fountain pedestal in substantially the manner indicated upon Fig. 1 at the location 24.

Fig. 3 illustrates a modification of the Fig. 4 structure wherein the clean water storage tank or reservoir is placed in an upright position between the main valve 70 and the riser 16. Since all of the parts illustrated upon Fig. 3 are found also in Fig. 4, the description of Fig. 4 applies as well to Fig. 3, wherefore the same reference characters have been applied to both drawing figures. It will be noted that in Fig. 3 the tank or reservoir is fully protected from injury by means of the various pipe fittings and other elements of the combination, and in addition, the tank or reservoir is located wholly above the jet or nozzle of the ejector. This arrangement expedites evacuation of tank 37 by the action of the ejector, and enables a slight reduction in the size of the tank due to the fact that some of the clean drained water from the riser will stand in the lower portion of the riser as well as within the tank 37.

Figure 6:
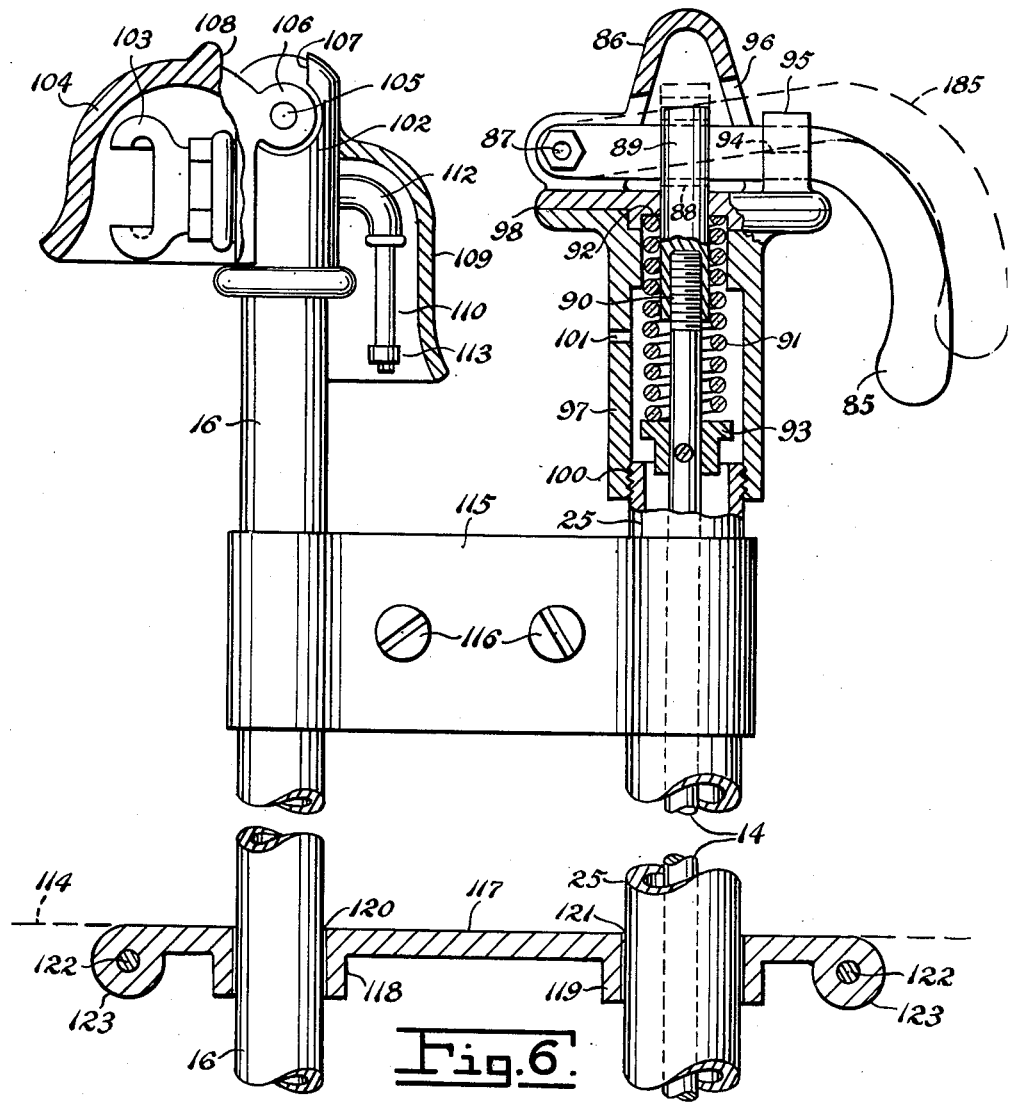
Fig. 6 is a side elevational view, partly in cross-section, showing a service hydrant which may be substituted for the drinking fountain of Fig. 1 in connection with the structures of Figs. 3, 4 and 5.

In Fig. 6 is illustrated a hydrant structure which is applicable to any of the assemblies shown in Figs. 3, 4 and 5. The riser 16 of Fig. 6 will occupy the same relationship to the ejector as is illustrated by Fig. 4, for example, while the valve rod 14 cooperates to actuate the valve as in Fig. 4. Port 74, of course, will be vented. Lifting of the valve rod to open the main valve, is according to Fig. 6 effected by means of a handle 85 pivoted upon the head 86 of the hydrant as indicated at 87, said handle at a point removed from the pivot being extended through an elongated vertical slot 88 formed diametrally in the valve rod cap 89 which is fixed to the upper end of said rod. A screw threaded connection 90 may be provided for this purpose.

To constantly urge the valve rod downwardly for seating the valve, a compression spring 91 may be furnished in encircling relationship to the rod, opposite ends of the spring being in firm abutment with the under face 92 of the hydrant head and the upper face of a spring seat member or stop collar 93 fixed upon the valve rod. The pivot at 87 is made sufficiently loose to permit not only a vertical movement of the handle as illustrated by the broken line 185, but also a slight lateral movement whereby the handle may be lodged upon the elevated shelf or shoulder 94 of a lug 95 upstanding upon the rim of the hydrant head 86. By this means, the handle may readily be held in an elevated position with the rod valve raised to keep the valve unseated or in the open position. A transverse slot 96 in the hydrant head is sufficiently wide to permit the lateral movement of the handle as stated, and as will be obvious the valve may be returned to closed position by simply displacing the handle laterally from the shelf or ledge 94.

The hydrant head may include a neck 97 fixed in any suitable manner to the head at the location 98, said neck being adapted to fit firmly over the protective casing tube 25 for the valve rod, which tube corresponds with that indicated at 25 in each of Figs. 3, 4 and 5. The joint shown at 100 may be a threaded connection, as shown. The protective casing for the valve rod may be vented as at 101, to atmosphere.

The character 16 indicates the riser, which corresponds in all respects with the riser illustrated in each of Figs. 3, 4 and 5, the lower extremity thereof being in operative relationship to the ejector as previously explained herein. A head fitting 102 is tightly applied to the upper end of the riser, and said fitting may have associated therewith any suitable type of quick acting hose coupler 103 through which water from the riser may be discharged. The hose coupling preferably is protected from injury and dirt by means of a shield 104. The shield may be in the form of a casting or stamping substantially enveloping the hose coupling part 103, and may be swung upwardly away from the coupling about the pivot pin 105 which projects laterally from the fitting 102. Hinge pins such as 105 may project in opposite directions laterally from fitting 102, to accommodate a pair of perforated eyes 106 formed upon the shield 104. Abutments 107 and 108 upon the fitting and the shield, respectively, may be furnished so as to limit swinging movement of the shield in an upward direction whereby the shield will always tend to fall by gravity to the protective position over the hose coupling element 103.

A second shield 109, which may be stationary in character and integral with the fitting 102 if desired, depends downwardly from the fitting to effectively cover the vacuum breaker indicated at 110. This vacuum breaker may be in the form of a tube placed in fluid communicating relationship with the interior of head fitting 102 through the agency of an elbow 112. A removable cap 113 may serve as a means of closing the lower open end of the vacuum breaker tube 110, for a purpose to be hereinafter explained.

It may here be noted that the valve rod housing 25 and the riser 16 can be extended to any desired elevation above ground level, the latter being indicated at 114. To maintain a substantial spaced parallelism of the parts 16 and 25, a suitable clamp 115 may be provided, the clamp being removable or adjustable by removing or loosening the clamp screws 116 which hold the opposite identical side plates of the clamp structure in place about the tubular members embraced thereby.

To support the hydrant assembly at ground level, a ground plate 117 may be provided to rest upon the ground, or if desired, to be imbedded in a platform of monolithic material such as concrete, this plate having a pair of depending bosses 118 and 119 bored as at 120 and 121 to loosely receive the tubular members 16 and 25, respectively. By means of this arrangement, heaving or sinking of the earth or the platform surrounding the fixture will not operate to apply any injurious or destructive forces or strains to the hydrant members 16 and 25. The ground plate may be in two parts with a longitudinal parting line bisecting the bosses 118 and 119, and held together by means of bolts 122 passing through eyes 123 formed at the opposite ends of the plate sections. If desired, however, the ground plate may be a casting or a stamping formed as a single piece of metal or other durable material.

The operation of the device illustrated by Fig. 6 is as follows.

Upon elevating the handle 25 to open the valve, such as that illustrated at 70 upon Fig. 4, water from the supply line 71 is permitted to flow at a rapid rate through the jet or nozzle of the ejector 72, the water being directed upwardly into the riser for discharge at the coupling element 103. As long as water discharges from the coupling, the flow will continue through the ejector nozzle and into the riser. However, upon lowering the handle to close the main valve 70, the unused water standing in the riser will gravitate downwardly through the ejector housing and into the clean water storage reservoir or tank 37. This will so reduce the head of water in the riser as to preclude freezing thereof above the frost line. Upon the next opening movement of the main valve 70, flow of water through the ejector nozzle will act to create a suction within the ejector housing to evacuate the water previously deposited within the tank or reservoir 37. The water so evacuated, as previously explained, is clean and potable water from the riser 16, and is therefore fit for human consumption. When the main valve 70 is again closed by lowering of the operating handle 85, the unused water standing in the riser again will flow into the clean water storage tank or reservoir 37, thereby completing the operating cycle. It will accordingly be understood that each successive opening and closing of the main valve will evacuate the storage tank, and permit its refilling with unused water from the riser. Each time that water enters the storage tank or reservoir, air will be displaced through the vent tube 29, into the protective casing tube 25 of the valve rod. The chamber formed by tube 25 may be vented at 101, as previously stated, and since the vent and the upper end of the tube are generally located well above ground level, the structure is protected against entry of surface water and contamination. As will readily be appreciated, the assembly illustrated by Fig. 3 is applicable with equal facility to the structure illustrated by Fig. 6, resulting in an identical mode of operation. In either case, the vacuum breaker 110 is maintained in a capped or closed condition by means of the closure element 113.

In the event that one may desire to eliminate the vent tube 29 of Figs. 3 and 4, so that no connection is present between the top of the tank and the lower portion of the valve rod casing 25, the vacuum breaker 110 of Fig. 6 will function in a manner to be explained, the understanding being that the clean water storage tank or reservoir 37 will be closed at its top so that it has connection only with the ejector through the agency of pipe 78.

Under the circumstances above assumed, and with the closure 113 applied to the vacuum breaker tube, a hose may be applied to the fitting 103 for conveying water from the riser to a remote point at the far end of the hose. The far end of the hose preferably will be furnished with a valve and nozzle as explained in my copending patent application Serial No. 691,138 executed on August 16, 1946, and entitled "Anti-Freezing Sanitary Hydrant Assembly," now Patent No. 2,545,911, March 20, 1951, and wherein it is proposed that the hose be permitted to rest upon the ground with water under pressure continuously maintained therein. With such an arrangement, the valve handle 85 may be continuously elevated to the broken line position of Fig. 6 for holding the main valve in the open position so that pressure of water will be maintained constantly within the riser, the storage tank, and the hose. No leakage will occur at the vacuum breaker because of the application of the closure 113, and whenever a flow of water is desired through the hose, the operator will merely open the valve at the nozzle on the far end of the hose. This arrangement is suitable for use under moderate weather conditions, or when there is no danger of water freezing within the hose and the riser of the hydrant.

In the winter season when temperatures fall below the freezing point, it is necessary to utilize the hydrant in a slightly different manner. That is, the flow of water will then have to be controlled at the main valve by means of the handle 85, rather than at the far end of the hose. Also, it will be necessary to remove the breaker cap 113, so that with each closing movement of the main valve any water standing in the riser will be replaced with air through the vacuum breaker as the water of the riser gravitates downwardly into the clean water storage tank or reservoir 37. Upon subsequent opening of the main valve by means of handle 85, water from the supply line 71 will flow through the ejector, creating a suction which lifts the stored water from tank or reservoir 37 and discharges it through the riser along with the water passed by the main valve. Upon subsequently closing the main valve, the head of water in the riser again will descend and flow into the storage tank or reservoir 37, thereby protecting the riser against freezing. This cycle of operation will be repeated upon each opening and closing movement of the main valve.

If the vacuum breaker is disposed well above ground level and is protected by means of the shield 109, entry of surface water or pollution into the riser and the storage tank associated therewith, is effectively prevented.

It will be appreciated, as heretofore explained, that no drainage need be provided for, either to the ground or to a sewer, in any of the proposed installations herein referred to. Accordingly, no cross connection either direct or indirect is possible for carrying pollution from extraneous sources to the interior of the fixture and its source of water supply. The tank or reservoir 37 is always a clean water chamber and constitutes part of the water supply line that serves the fixture, thereby avoiding to a maximum extent the possibility of pollution of the water distribution system of which the supply line is a part.

Of substantial importance to the present invention is the elimination of a service box at platform level, since such boxes have always been regarded as dirt catchers and a potential source of pollution. By eliminating the service box, the present invention avoids the need for trenches, ditches, sumps and sump pumps which were costly to install and maintain, and yet frequently incapable of preventing the possibility of pollution. Service boxes also formed objectionable obstructions in the paving or upon the ground, and were particularly hazardous to pedestrians and freight traffic upon becoming broken or damaged.

The device of the invention, as will now be appreciated, affords full protection against pollution of the water supply system under all circumstances of usage, and is effectively protected against injury by freezing during the winter season. In the case of the drinking fountain, all surplus water drains completely from all parts located above the frost line, wherefore winter storage and spring replacement of such fixtures is unnecessary. The construction is foolproof, inexpensive and easy to install and maintain, with a resultant substantial saving of expense. The device is sturdy and durable, and will resist public abuse to the utmost for year round service. Other advantages and desirable features of the device have been recited hereinbefore, and therefore need not be repeated in the summary.

Devices of the character illustrated by Fig. 6 incorporating either of the arrangements illustrated by Figs. 3 and 4, are particularly useful in avoiding pollution of public water distribution systems in the vicinity of railroad yards where drainage generally is poor and the surroundings are more or less dirty and unsanitary. The topography in the vicinity of railroad yards renders pollution of hydrant fixtures and supply lines particularly hazardous, however, the fixture herein disclosed has been designed to operate effectively under the most unfavorable conditions encountered in railroad yards and similar unfavorable locations.

In each of Figs. 3, 4 and 5, the vent for displacement of air from the clean water storage tank or reservoir may be omitted, particularly if the tank or reservoir is made slightly larger to compensate for air that might be entrapped therein as it receives unused water from the riser. However, where an increase in the capacity and size of the tank or reservoir is objectionable, the vent is preferred. As was previously mentioned herein, the valve and ejector assemblies disclosed are applicable to hydrants as well as drinking fountains. The vents for the storage tanks or reservoirs in every instance may be carried upwardly above ground level, to any desired elevation. In the case of Fig. 2, it may be noted, the housing 26 might extend upwardly within the pedestal to a much greater elevation if desired.

Figure 7:
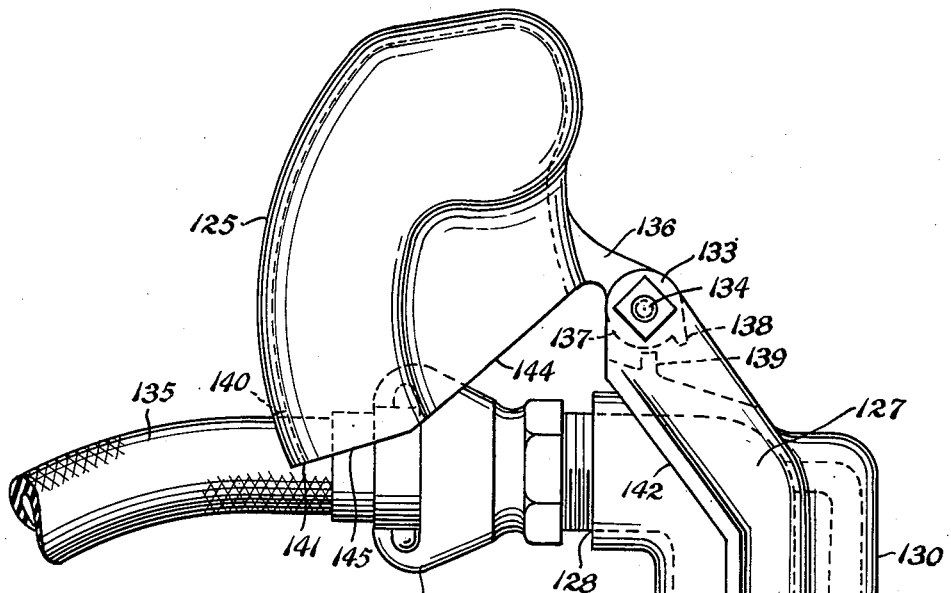
Figs. 7 and 8 are side elevational views of a hydrant head, and illustrate a modification of the head shown in Fig. 6.
Figure 8:
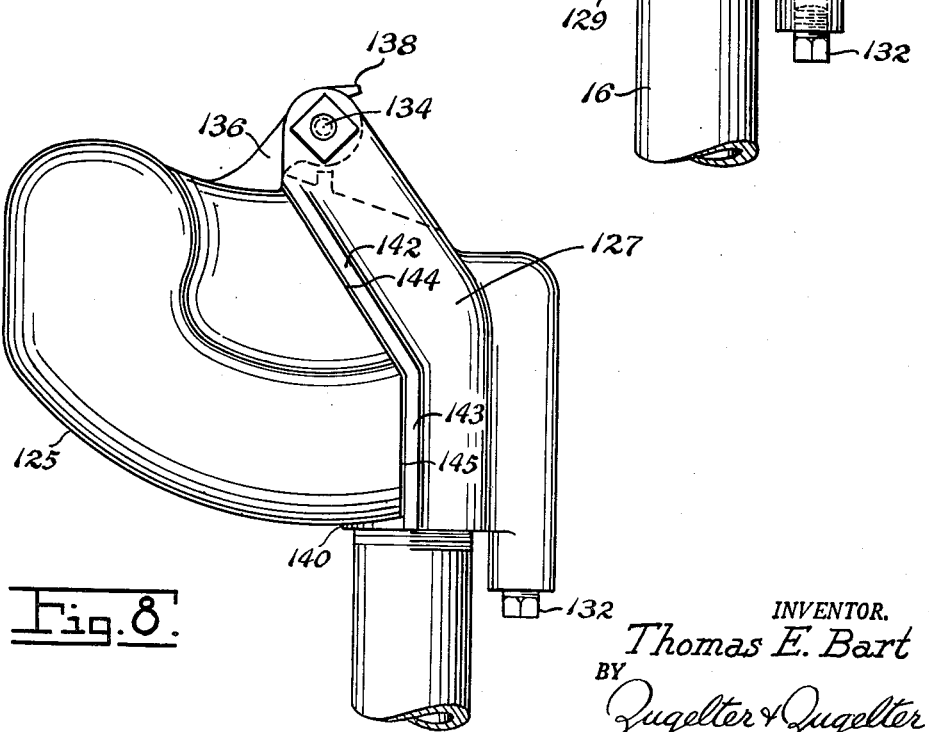

Figs. 7 and 8 illustrate a modified form of hydrant head which is distinguishable from the head 102 of Fig. 6, in that it includes a shield or hood 125 which completely encloses the quick-action coupling member 126, when lowered as in Fig. 8. The modified form of head, indicated generally by the character 127, may comprise a hollow casting of substantial elbow shape, the ports 128 and 129 of which are internally threaded to receive the coupling member 126 and the upper threaded end of the riser 16, respectively. An integral cored extension 130 on the head 127, drilled out as indicated at 131 to form a restricted weep hole, constitutes a vacuum breaker simulating that indicated by characters 110—112 of Fig. 6. The plug or closure for disabling the vacuum breaker under moderate weather conditions, is indicated at 132.

A pair of upstanding spaced parallel ears 133 may be cast integrally with the head and provided with a transverse bore to receive a hinge pin or bolt 134 for hingedly mounting the hood 125 so that it may be elevated and lowered, as shown by Figs. 7 and 8, respectively. The hood is hollow as indicated, and is sufficiently wide to pass over the coupling member 126 when lowered to the covering position of Fig. 8, the hose 135 being detached. A frangible neck 136 integral with the hood, carries a perforate lug 137 through which the pin or bolt 134 passes, and from the lug may extend a stop finger 138 adapted to contact a cooperative stop lug 139 located between the ears 133. These parts 138 and 139 limit the opening movement of the hood so that it may not tilt upwardly beyond dead center and thereby remain in open position. The hood, therefore, is self-closing and when the hose 135 is attached to the hydrant as in Fig. 7, the hood rests upon the hose at 140, where the leading edge 141 of the hood is arcuately cut away to fit the curvature of the head when closed (Fig. 8).

Along both sides of head 127 are formed the laterally extending rib sections 142 and 143, which provide abutments for the edge portions 144 and 145 of the hood when closed or lowered to the Fig. 8 position. As the result of this fitting of the hood to the head part 127, a substantial closure is effected for protecting the coupling member when not in use, so that contaminating matter from the toilet hoppers of passing cars may not reach the vital parts of the hydrant and induce pollution of the fresh water supply line which serves it.

What is claimed is:

1. The combination with a frost and pollution-proof hydrant comprising a water jet ejector, a riser connected to the outlet of said ejector, a reservoir, and a suction line connecting said ejector to said reservoir, the reservoir being adapted to receive riser drainage when the supply of water to said ejector is shut off, of a control valve assembly which comprises a hollow valve body having an inlet port, an outlet port connected to the inlet of the ejector for supplying water under pressure to the ejector, and a control port, a valve seat in said body between the inlet and outlet ports and facing the control port, a valve member reciprocably mounted in the control port for movement from an open position in which the inlet and outlet openings are in communication to a closed position in which the valve member engages the valve seat to interrupt communication therebetween, an elongated valve actuating rod attached to and extending upwardly from the valve member, an elongated hollow water-tight housing attached to the control port of the hydrant and surrounding the actuator rod and extending upwardly to above ground level, the diameters of said valve member and housing being such that the valve member may be withdrawn by said rod from the valve body through said housing, a vent conduit connecting the interior of said reservoir to the interior of said elongated housing at a point above said valve, above the reservoir and below frost level means for normally yieldingly urging the actuator and valve member to closed position, and means for lifting the actuator and valve member to open the valve.

2. The combination with a frost and pollution proof hydrant comprising a water jet ejector, a riser connected to the outlet of said ejector, a reservoir, and a suction line connecting said ejector to said reservoir, the reservoir being adapted to receive riser drainage when the supply of water to said ejector is shut off, of a control valve assembly comprising a hollow valve body having an inlet port, an outlet port connected to the inlet of the ejector for supplying water under pressure to the ejector, and a control port, a valve seat in said body between the inlet and outlet ports and facing the control port, a valve member reciprocably mounted in the control port for movement from an open position in which the inlet and outlet openings are in communication to a closed position in which the valve member engages the valve seat to interrupt communication therebetween, an elongated valve actuating rod attached to and extending upwardly from the valve member, an elongated hollow water-tight housing attached to the control port of the hydrant and surrounding the actuator rod and extending upwardly to above ground level, a vent conduit connecting the interior of said reservoir to the interior of said elongated housing at a point above said valve and said reservoir and below frost level, means for yieldingly urging the actuator and valve member to closed position, and means for lifting the actuator and valve member to open the valve.

THOMAS E. BART.

REFERENCES CITED

The following references are of record in the file of this patent:

UNITED STATES PATENTS

| Number | Name | Date |
| --- | --- | --- |
| Re. 7,243 | Clover | July 25, 1876 |
| 114,283 | Gallagher | May 2, 1871 |
| 1,146,946 | Murdock | July 20, 1915 |
| 1,216,815 | Kelly | Feb. 20, 1917 |
| 1,501,799 | Neumeyer | July 15, 1924 |
| 1,507,718 | Rilling | Sept. 9, 1924 |
| 1,850,359 | Simmons | Mar. 22, 1932 |
| 1,916,767 | Mason | July 4, 1933 |
| 2,097,733 | Miller | Nov. 2, 1937 |
| 2,254,408 | Allen | Sept. 2, 1941 |
| 2,280,820 | Gowdy | Apr. 28, 1942 |
| 2,280,838 | Murdock et al. | Apr. 23, 1942 |

FOREIGN PATENTS

| Number | Country | Date |
| --- | --- | --- |
| 7,520 | Germany | of 1879 |
| 16,210 | Germany | of 1881 |